United States Patent [19]
Ueno et al.

[11] Patent Number: 5,655,439
[45] Date of Patent: Aug. 12, 1997

[54] APPARATUS FOR ROLLING UP STICK-LIKE BREAD

[75] Inventors: Sadao Ueno; Mikio Kobayashi; Tsunehiko Yoshida, all of Utsunomiya, Japan

[73] Assignee: Rheon Automatic Machinery Co., Ltd., Japan

[21] Appl. No.: 649,219

[22] Filed: May 17, 1996

[30] Foreign Application Priority Data

May 19, 1995 [JP] Japan ................................ 7-145517

[51] Int. Cl.⁶ .................... A21C 3/06; A21C 11/00; A21D 6/00; A23P 1/00
[52] U.S. Cl. ................. 99/450.2; 99/353; 99/450.1; 425/321; 425/325; 425/335; 425/373; 425/115; 425/329
[58] Field of Search ................. 99/494, 450.1–450.8, 99/353; 425/115, 373, 335, 321, 391, 325, 329, 297; 426/497, 501, 500, 502, 512

[56] References Cited

U.S. PATENT DOCUMENTS

| | | | |
|---|---|---|---|
| 4,685,387 | 8/1987 | Hanson et al. | 99/450.4 |
| 4,741,263 | 5/1988 | Ueno et al. | 99/450.2 |
| 4,842,879 | 6/1989 | Ek | 426/297 |
| 5,036,756 | 8/1991 | Lindee | 99/450.4 |
| 5,142,956 | 9/1992 | Ueno et al. | 99/450.1 X |
| 5,281,120 | 1/1994 | Morikawa et al. | 425/321 X |
| 5,440,974 | 8/1995 | Ueno et al. | 99/450.2 |
| 5,460,079 | 10/1995 | Bartow et al. | 99/353 |
| 5,460,081 | 10/1995 | Ueno et al. | 99/450.2 |

*Primary Examiner*—Timothy F. Simone
*Attorney, Agent, or Firm*—Limbach & Limbach L.L.P.

[57] ABSTRACT

The present invention provides an apparatus to stably and continuously roll up bread dough into stick-like bread, such as bread dough or bread dough on which ham or cheese is put. The apparatus includes a drive shaft located parallel to a conveying surface of a conveyor and a plurality of circular dough-holding disks mounted on the drive shaft. A plurality of dough-rolling plates is provided between the adjacent dough-holding disks along the conveying surface. The rolling plates roll the bread dough and the like. The apparatus securely rolls bread dough of a nonuniform thickness or bread dough on which ham and the like is put. Also, the present invention can securely roll a plurality of rows of bread dough that is conveyed.

6 Claims, 2 Drawing Sheets

APPARATUS FOR ROLLING UP STICK-LIKE BREAD

BACKGROUND OF THE INVENTION

The present invention relates to a molding apparatus to roll bread dough or bread dough on which ham or cheese or the like is deposited.

Many prior-art molding and rolling-up devices are known. For example, a single rolling plate is used, which is spaced apart a uniform distance from the conveyor. In this case bread dough is supplied to the space for the dough to be rolled. Also, a curl net covered with a cloth is used to cover a predetermined area of a conveying surface of the conveyor. Bread dough is supplied to the space between the curl net and the conveyor to roll the bread dough in the space. These devices are commonly used.

However, in these conventional devices bread dough having a nonuniform thickness cannot be rolled into a stick-like form, if the thickness of the bread dough varies due to the uneven fermentation of the bread dough or foam formed in it. Further, when it is desired to roll the bread dough by depositing on it ham or the like in an overlapping relationship, the ham slips and moves on the bread dough in the space between the pressing plate and the conveyor. Thus these devices cannot satisfactorily roll the bread dough.

Further, when a plurality of rows of bread dough is rolled by using a single and unitary dough-rolling plate, the bread dough must have a uniform thickness and the dough must be simultaneously supplied to the rolling plate so that the plate pressingly rolls the dough uniformly. Thus this is disadvantageous, in that the dough is rolled nonuniformly and conveyed in an unevenly rolled condition.

SUMMARY OF THE INVENTION

The present invention intends to overcome these problems. It provides a bread-dough molding apparatus to roll and form stick-like bread. In this invention, when bread dough is rolled to have a stick-like form, it is rolled without giving it a nonuniformly rolled phenomenon. Further, the present invention enables bread dough on which ham or the like is deposited to be rolled by preventing the ham on the bread dough from slipping.

To attain the above purpose, a plurality of dough-holding disk-like plates is mounted on a drive shaft that is positioned parallel to the conveying surface of a conveyor and at right angles to the conveying direction of the conveyor. Dough-rolling plates are provided along the conveyor's conveying surface between the dough-holding disks. The upstream ends of the dough-rolling plates are rotatably mounted on a supporting shaft so as to locate the rolling plates closely adjacent to each other.

The bread dough conveyed is forcibly fed by the dough holding disks and is rolled in the space between the plurality of dough-rolling plates and the conveyor's conveying surface.

When the bread dough with ham thereon is conveyed, they are both forcibly conveyed as the dough-holding disks hold them from above. When the downstream end of the bread dough contacts the dough rolling plates, the rolling-up operation of the dough starts.

When this rolling-up operation is performed, the bread dough and the ham are held by the plurality of dough-holding disks. Thus the bread dough with the ham thereon is forcibly and securely fed to the rolling plates and rolled up and the ham on the bread dough is prevented from slipping.

After the above operation is performed, the plurality of the dough-rolling plates moderately press the bread dough. Thus the bread dough is securely rolled up, preventing the dough from skidding and slackening.

Since the dough-holding disks press the bread dough and the ham together to reliably supply them to the plurality of the dough-holding plates and the rolling plates moderately press the bread dough from above, the bread dough is rolled uniformly for its entire length.

The present invention provides a dough piece rolling-up apparatus characterized by comprising a drive shaft located parallel to the conveying surface of a conveyor and at right angles to the advancing direction of the conveyor, a plurality of dough-holding disks mounted on the drive shaft, and dough-rolling plates provided along the conveying surface of the conveyor between the dough holding disks.

EMBODIMENT

Figure 1:
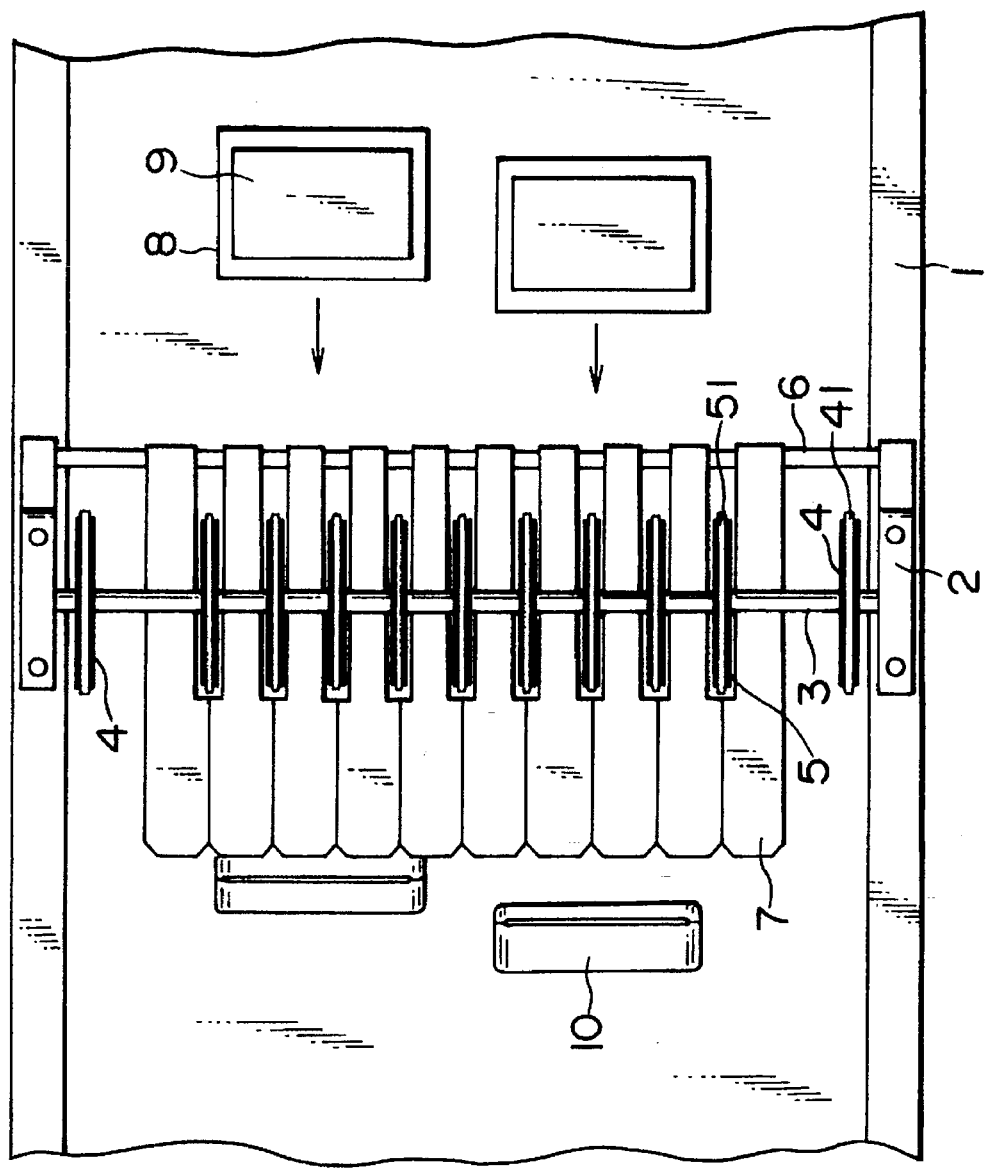
FIG. 1 shows an embodiment of the apparatus of the present invention.

A description of a preferred embodiment of the present invention will now be explained. A base 2 is mounted on a conveyor frame 1. A shaft 3 is supported by the base 2.

Disks 4 are connected to the shaft 3 at the opposite ends thereof. A belt 41, which is circular in cross section, is wound around each of the disks 4. The belt 41 is mounted on each of the disks in a pressing relationship to the conveyor belt 11.

Thus the disks 4 are rotated by the conveyor belt 11 via the belt 41 as the conveyor belt 11 advances.

A plurality of dough-holding circular disks 5 are mounted on the shaft 3 at equal intervals. The dough-holding disks 5 have a diameter which is less than that of the disks 4. Around the dough-holding disks 5 a belt 51 that is circular in cross section is wound. A slight space exists between this belt 51 and the conveyor belt 11, so that they do not contact each other.

As shown in FIG. 1, a plurality of dough-rolling plates 7 are rotatably mounted on a shaft 6 which is supported by the base 2. The plates 7 are located close to each other.

Figure 2:
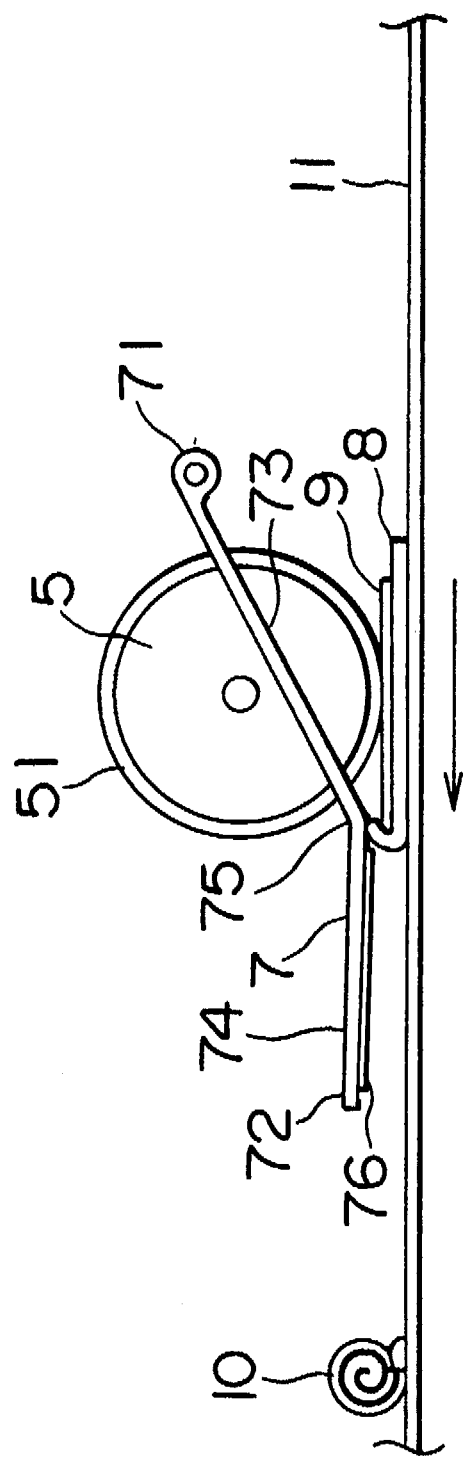
FIG. 2 is a view showing the structure and the effect of the present invention.

The dough-rolling plates 7 are located between the dough-holding disks 5. As in FIG. 2, the dough-holding plates 7 are formed with a supporting portion 71 and a free end 72. The holding plates 7 include inclined portions 73, and horizontal portions 74 that extend toward the free end 72.

The number 8 denotes rectangular bread dough carried by the conveyor belt 11, one side of the dough being positioned at right angles to the advancing direction of the conveyor belt 11.

A piece of ham 9 is put on the bread dough 8.

Slip-preventing members 76 are fixed to the lower surface of the holding plates 7 to increase the rolling friction between the holding plates 7 and the Dread dough 8.

The rolling-up operation of stick-like bread will now be explained. When the conveyor belt 11 advances the disks 4 are rotated. Thus the dough-holding disks 5 are also rotated.

The bread dough 8 and the ham 9 thus conveyed are gripped between the dough-holding disks 5 and conveyor belt 11 to be forcibly conveyed in the downstream direction.

In this operation the leading end of the bread dough 8 contacts an angled portion 75 of the rolling plate 7.

At this time the rolling-up operation of the bread dough 8 starts, and rolled-up dough 10 is formed.

The rolling-up operation of the bread dough 8 is performed in the area extending from the angled portion 75 to the free end of the holding plate 7. While this operation is performed the bread dough 8 is forcibly gripped between the dough-holding disks 5 and the conveyor belt 11 to convey the bread dough 8 downstream. Thus at the beginning of the rolling-up operation, when the bread dough 8 contacts the angled portion 75, the bread dough 8 does not slip on the conveyor belt 11 and it can be securely rolled up from its leading end. In the prior-art bread dough rolling-up operation, all parts of the dough could not be consistently and simultaneously rolled up in the longitudinal direction, but the dough was often rolled up diagonally, or rolled up such that a separation of the ham from the bread dough took place.

In this invention the width from the angled portion 75 to the free end of the dough-rolling plate 7 is made narrow and each of the rolling plates 7 is independently located. This dispenses with the prior-art rolling-up apparatus wherein only a single and unitary rolling plate was used relative to the longitudinal direction of a piece of dough to be rolled. In the present invention, since a plurality of separate rolling plates 7 is provided to press the bread dough 8 from above, the bread dough 8 is evenly rolled up along its entire length.

When a single and unitary rolling plate having a broad width is used for rolling up the bread dough as in the prior-art apparatus, when bread dough that does not have a uniform thickness is rolled the thick portion of the dough is rolled up to be thicker than the thin portion of the dough. This causes the dough to be twisted, and the ends of the rolled-up dough are not uniform or only the part of the dough that is near one end of it is rolled. This is a disadvantage of the prior art. This disadvantage has been overcome by the present invention.

As explained above, when the bread dough is conveyed, the dough holding disk-like plates press bread dough or the bread dough on which ham or cheese is put. The bread dough or the bread dough on which the ham or cheese is put is forcibly conveyed to the rolling plate to be rolled thereby. Since the bread dough when it is rolled contacts the rolling plates, it does not slip on the conveyor belt. This structure makes it possible to prevent any slackening of rolled-up dough and to bring about securely rolled-up bread dough.

When the bread dough is rolled, it is moderately pressed by the dough-rolling plates. Thus, even if the thickness of the bread dough is nonuniform, it can be rolled uniformly for its entire length.

Also, since a plurality of separate dough-rolling plates is used for a piece of bread dough, the rolling plates press from above every portion of the plurality of rows of the bread dough and roll the dough.

As stated above, the present invention improves the rolling-up effect of stick-like bread and also makes possible the rolling into a stick-like form of two overlapping kinds of materials, as, for instance, ham and bread.

The invention claimed is:

1. An apparatus for rolling up dough pieces conveyed on a conveyer belt comprising:

a plurality of disks mounted on a drive shaft for pressing and forcedly conveying the dough pieces during the rolling-up process, with a given interval between the conveyer belt and the disks, the drive shaft being disposed parallel to the belt and at right angles to the traveling direction thereof, and a plurality of plates, disposed adjacently on both sides of the disks, for rolling up the dough pieces by pressing the dough pieces being rolled up.

2. An apparatus of claim 1, wherein each of the plurality of plates has a free end and consists of an upwardly inclined portion and a horizontal portion, the end of which horizontal portion forms said free end, and wherein each plate is pivotally mounted on a shaft at the other end of the plate such that the dough piece being rolled up through the parallel portion is uniformly pressed down across its entire width.

3. An apparatus for rolling up dough comprising:

a conveyor with a conveying surface capable of conveying a dough piece in an advancing direction;

a shaft located parallel to the conveying surface of the conveyor and at a right angle to the advancing direction of the conveyor;

a plurality of disks mounted along the shaft, the disks having edges adapted to press the dough piece against the conveying surface of the conveyor; and, a plurality of plates, the plates disposed between adjacent disks and along the conveying surface, and adapted to engage the dough piece so as to roll up and press the dough piece against the conveying surface of the conveyor.

4. The apparatus of claim 3, wherein each of said plates is comprised of a fixed, rotatable end and a free end, the free end being diposed generally parallel to the conveying surface of the conveyor.

5. The apparatus of claim 4, wherein said fixed, rotatable end is mounted to a second shaft orientated parallel to said shaft.

6. The apparatus of claim 3, wherein said plates roll up and press the dough piece against the conveying surface uniformly across the entire width of the dough piece.

* * * * *